United States Patent
Russell et al.

(10) Patent No.: US 8,817,740 B2
(45) Date of Patent: *Aug. 26, 2014

(54) METHODS AND DEVICES OF A QUEUE CONTROLLER FOR DUAL MODE BIDIRECTIONAL AUDIO COMMUNICATION

(75) Inventors: Michael E. Russell, Lake Zurich, IL (US); Mark R. Braun, Arlington Heights, IL (US); Arnold Sheynman, Northbrook, IL (US); Tongyan Zhai, Pleasant Prairie, WI (US)

(73) Assignee: Motorola Mobility LLC, Libertyville, IL (US)

( * ) Notice: Subject to any disclaimer, the term of this patent is extended or adjusted under 35 U.S.C. 154(b) by 737 days.

This patent is subject to a terminal disclaimer.

(21) Appl. No.: 11/842,275

(22) Filed: Aug. 21, 2007

(65) Prior Publication Data
US 2008/0144645 A1 Jun. 19, 2008

Related U.S. Application Data

(60) Provisional application No. 60/863,593, filed on Oct. 31, 2006.

(51) Int. Cl.
*H04W 4/00* (2009.01)
*H04L 12/28* (2006.01)

(52) U.S. Cl.
USPC ............ 370/331; 370/338; 370/389; 370/401

(58) Field of Classification Search
None
See application file for complete search history.

(56) References Cited

U.S. PATENT DOCUMENTS

| 5,986,589 | A | 11/1999 | Rosefield et al. |
| 2001/0005367 | A1* | 6/2001 | Liu et al. ................. 370/389 |
| 2002/0004397 | A1* | 1/2002 | Lee et al. ................. 455/442 |
| 2002/0071477 | A1 | 6/2002 | Orava |
| 2004/0062269 | A1* | 4/2004 | Western ................... 370/465 |
| 2004/0202128 | A1* | 10/2004 | Hovmark et al. .......... 370/331 |
| 2005/0041694 | A1* | 2/2005 | Liu ........................... 370/524 |

(Continued)

FOREIGN PATENT DOCUMENTS

| EP | 1089502 A | 9/2000 |
| GB | 2373412 A | 1/2002 |
| WO | 2004034722 A2 | 4/2004 |

OTHER PUBLICATIONS

Bluetooth Sig: "Bluetooth Core System Package [Controller Volume], Part B, Baseband Specification, Version 1.2", Nov. 5, 2003, vol. 2, pp. 45-188.

(Continued)

*Primary Examiner* — Brandon Renner

(57) ABSTRACT

Disclosed are a queue controller and method thereof for dual mode I/O devices and methods for transmission of a short range radio link such as a Bluetooth link that is a bi-directional real-time audio communication signal that can be over a first transport or a second transport. The described queue controller can transform a single input queue having heterogeneous packet types to a queue having homogeneous packet types in a case where heterogeneous audio packet types are anticipated. According to control signals that can be based upon operating conditions and transport selection, a first control signal or a second control signal can control the single input queue transformation. After a transport is selected, a single input queue can be processed by a queue controller configured to transform the single input queue having heterogeneous packet types to a queue having homogeneous packet types.

19 Claims, 9 Drawing Sheets

(56) References Cited

U.S. PATENT DOCUMENTS

| | | |
|---|---|---|
| 2006/0030327 A1* | 2/2006 | Lee et al. .................. 455/442 |
| 2006/0056332 A1 | 3/2006 | Arase et al. |
| 2006/0056383 A1* | 3/2006 | Black et al. ................ 370/350 |
| 2006/0120329 A1* | 6/2006 | Kim et al. .................. 370/331 |
| 2007/0010250 A1* | 1/2007 | Bosch et al. ............... 455/436 |
| 2007/0014259 A1* | 1/2007 | Fajardo et al. ............. 370/331 |
| 2007/0110015 A1* | 5/2007 | Chakraborty et al. ....... 370/338 |
| 2007/0143105 A1* | 6/2007 | Braho et al. ............... 704/231 |
| 2010/0172271 A1 | 7/2010 | Guccione |

OTHER PUBLICATIONS

PCT Search Report; International Application No. PCT/US2007/081414; Date of Mailing Aug. 6, 2008; 15 pages.

Kapoor R et al; "Bluetooth: Carrying Voice Over ACL Links", Mobile and Wireless Communications Network, 2002. 4th International Workshop on Spe 9-11, 2002, Piscataway, NJ, USA, whole document.

United States Patent and Trademark Office, "Non-Final Rejection" for U.S. Appl. No. 11/842,259 dated May 28, 2010, 11 pages.

United States Patent and Trademark Office, "Non-Final Rejection" for U.S. Appl. No. 11/842,259 dated May 7, 2013, 12 pages.

\* cited by examiner

Two sources of audio packets

Single sources of audio packets

METHODS AND DEVICES OF A QUEUE CONTROLLER FOR DUAL MODE BIDIRECTIONAL AUDIO COMMUNICATION

CROSS REFERENCE TO RELATED APPLICATION

This Application is related to Assignee's Application entitled METHODS AND DEVICES FOR DUAL MODE BIDIRECTIONAL AUDIO COMMUNICATION, filed on Oct. 31, 2006, having U.S. Ser. No. 11/842,259.

FIELD

Disclosed are communication devices and methods thereof, and more particularly a queue controller and methods of a queue controller for dual mode bi-directional audio terminal devices and audio gateway devices.

BACKGROUND

Bluetooth wireless technology provides a manner in which many wireless devices may communicate with one another, without connectors, wires or cables. Bluetooth technology uses the free and globally available unlicensed 2.4 GHz Industrial, Scientific, and Medical (ISM) spectrum, for low-power use, allowing two Bluetooth devices within a range of up to 10 to 100 meters to share data with throughput up to 2.1 Mbps. Each Bluetooth device can simultaneously communicate with multiple other devices.

Current common uses for Bluetooth technology include those for headsets, cellular car kits and adapters. Moreover, Bluetooth technology is currently used for connecting a printer, keyboard, or mouse to a personal computer without cables. Since Bluetooth technology can facilitate delivery of large amounts of data, computers may use Bluetooth for connection to the Internet through a mobile phone. Bluetooth devices can connect to form a piconet, which consists of a master and up to seven slave devices. Two types of connections can be established in a piconet: a Synchronous Connection Oriented (SCO) link, and an Asynchronous Connectionless (ACL) link. SCO links provide a circuit-oriented service with constant bandwidth based on a fixed and periodic allocation of time slots that is used for voice transmission. There are also extended synchronous connection-oriented packets (eSCO) that have the same functionality as SCO packets but allow for more packet types, data types, and limited retransmissions. ACL connections, on the other hand, provide a packet-oriented service that is used for transmission of data and control signals. Traditionally, voice communication on SCO is bi-directionally processed by a voice codec or encoder/decoder while stereo communication on ACL is uni-directionally processed by a stereo codec that is encoded by the source and decoded by the sink without an audio return path. In a communication device, there are two separate codecs, one for processing mono audio on SCO and the other for processing stereo audio on ACL.

Wireless Local Area Networks (WLANs) are becoming compatible with many different types of products. While businesses originally installed WLANs so that desktop computers could be used on networks without expensive wiring, the functionality of the WLANs has evolved to allow mobile communication devices, such as wireless telephones, laptop computers, personal digital assistants (PDAs) and digital cameras to connect to WLANs for Internet access and wireless Voice over Internet Protocol (VoIP) telephone service. Short for wireless fidelity, WiFi is a trademark for sets of product compatibility standards for WLANs. Manufacturers of mobile communication devices such as cellular telephones are WiFi enabling the devices so that when a user roams into a WiFi hot spot, a telephone can switch its communication protocol from the cellular band that uses licensed, limited spectrum to WiFi communication protocol that uses available unlicensed spectrum. In indoor situations, a switch to a WiFi protocol from a cellular network such as one based on the Global System for Mobile Communication standard (GSM) may be additionally beneficial since a cellular network can lose its signal strength indoors while a WLAN may have a strong signal within a hotspot.

The Bluetooth 2.4 GHz radio band is close to that of particular transceivers that operate at 2.3 GHz or 2.5 GHz, such as a Worldwide Interoperability for Microwave Access (WiMAX) transceiver based on IEEE 802.16e. Communication of audio signals between Bluetooth devices may collide in time with other signals such as WiFi and other standards-based wireless technologies such as WiMAX, thus desensitizing the receivers due to insufficient blocking performance and overlapping spectrum allocations. There can be adjacent channel interference with WiFi for example and with WiMAX, as the Bluetooth guard band is only 20 MHz. Synchronous connections, in particular SCO, such as those used in headsets are inflexible in scheduling of transmission and reception and result in simultaneous use of both radios, especially in an "802.16e" transceiver on a mobile device having packets scheduled by the WiMAX basestation, causing interference problems. While synchronous connections using eSCO have a limited ability to schedule packet transmissions, due to the limited retransmission window, they will still have periodic collisions with other wireless technologies and use more bandwidth and system resources than SCO links. The Bluetooth Core Specification describes a solution for co-existence with WiFi that mitigates interference. Advanced Frequency Hopping (AFH) is one technique that shrinks the available bandwidth to prevent using the same portion of the ISM band as another technology. However this does not solve the problem of adjacent channel interference from other technologies such as WiMAX with high transmit powers and poor adjacent channel rejection. When Bluetooth and WiFi or WiMAX are collocated, AFH can be insufficient and a collaborative method of co-existence such as Packet Traffic Arbitration (PTA) may be used. However, PTA can significantly impact the WiFi data rate when Bluetooth SCO or eSCO is active.

Bluetooth devices, and particularly headsets, enjoy popularity because they can offer users the ability to communicate while seamlessly operating in different environments. Accordingly, providing improved voice quality over Bluetooth has become important for mobile device manufacturers. It would be beneficial were improvements made to audio quality over Bluetooth.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
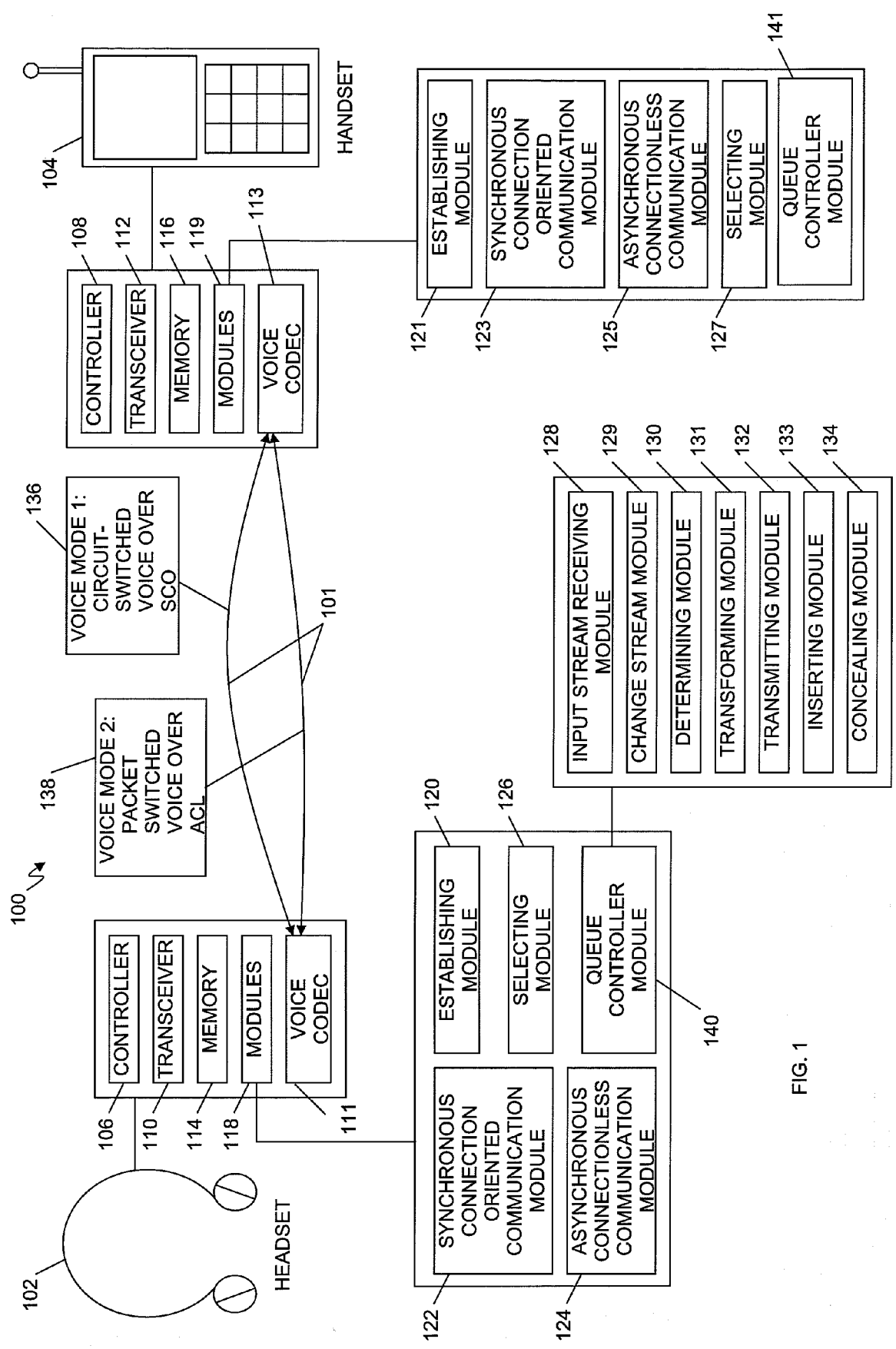
FIG. 1 illustrates a system of two Input/Output (I/O) devices configured to transmit and/or receive via a short range radio link.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

For improved voice quality of an I/O device while receiving and transmitting audio communication, an I/O device may switch between a first transport and a second transport that can be an SCO transport and an ACL transport. A switch, in hardware and/or software, can be configured for effecting transport selection, thus switching audio communication signals between the first transport and the second transport. A description of such I/O devices, systems of I/O devices and methods thereof is hereby incorporated by reference to substantially simultaneously filed METHODS AND DEVICES FOR DUAL MODE BIDIRECTIONAL AUDIO COMMUNICATION, on the date of Aug. 21, 2007, having received a Ser. No. 11/842,259, and U.S. Pat. No. 8,792,945.

Disclosed are a queue controller and method thereof for dual mode I/O devices and methods for transmission of a short range radio link such as a Bluetooth link that is a bi-directional real-time audio communication signal that can be over a first transport or a second transport. The described queue controller transforms a single input queue that will be processed by an encoder/decoder such that a single input queue having heterogeneous packet types is transformed to a queue having homogeneous packet types in a case where heterogeneous audio packet types are anticipated. It is understood that a single input queue can be a buffer that contains audio data to be processed. The input can be relative to the source of audio packets and is not limited to describing only a single queue. The audio packets from a downlink audio stream to be sent to an encoder or from a transducer to be sent as uplink audio would constitute two single input queues. Homogeneous packet types refer to a group of audio packets having identical encoder parameters, where as heterogeneous packet types refer to a group of audio packets having different encoder parameters. Hard and soft handoffs may be used depending upon a change stream control signal. According to the control signals, a first control signal or a second control signal can control the single input queue transformation. The change stream signal can be based upon operating conditions and transport selection. After a transport is selected, a single input queue can be processed by a queue controller configured to transform the single input queue having heterogeneous packet types to a queue having homogeneous packet types.

Transport selection and thus the change stream signal can be based on both transports' advantages and disadvantages when transferring audio, and in particular voice data. Having both SCO/eSCO and ACL modes available may allow the user to optimize voice quality or data throughput under different operating conditions. From this point on the term SCO or SCO mode will include the functionalities of eSCO. It is understood that voice communication is an example of a bi-directional audio communication.

In some noisy RF environments, voice over ACL may result in better audio quality than SCO. In either case, the user may benefit from better Bluetooth voice quality and may have the flexibility of using either mode (SCO or ACL) depending upon the situation. In particular, switching between SCO and ACL can be based on certain criteria such as quality of signal indicators or network infrastructure, for example, when handing over from a GSM cell to a WiFi access point or WiMAX basestation.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

At least some inventive functionality and inventive principles may be implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 illustrates a system 100 of two I/O devices 102 and 104 configured to transmit and/or receive via a short range radio link. The short range radio link can be a Bluetooth link that is a bi-directional real-time audio communication signal, and can be sent over a synchronous circuit-switched transport and an asynchronous packet-switched transport either sequentially or simultaneously. The system 100 can include more than two devices. The first device 102 is depicted as a wireless audio terminal, such as a Bluetooth headset, Bluetooth handsfree carkit, a mobile phone or a Bluetooth adapter with attached stereo speakers. The second device 104 is depicted as an audio gateway such as a mobile communication device, a computer, a Bluetooth headset or a Bluetooth handsfree carkit. A second device 104 may be complimentary to the first device 102 so far as the functions and some, most or all of the Bluetooth architecture. However, the functions and/or architecture may be unique to each device as well.

The mobile communication device 104 may be implemented as a cellular telephone (also called a mobile phone).

The mobile communication device 104 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The devices 102 and 104 are depicted as each having a controller 106 and 108 respectively. They also can include one or more transceivers 110 and 112. Each device 102 and 104 may further include a voice codec that can also be referred to as an encoder/decoder 111 and 113 respectively. The terms encoder, encoder/decoder, analog-to-digital (A/D) and digital-to-analog (D/A) converter, and codec may be used interchangeably. Moreover, the devices 102 and 104 can include memory 114 and 116 which may store instruction modules 118 and 119, respectively.

The modules 118 of device 102 and 119 of device 104 can carry out certain processes of the methods as described herein. Steps of methods may involve modules and modules may be inferred from and/or implied by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Establishing modules 120 and 121 are for transceiving real-time audio signals from a single source. SCO communication modules 122 and 123 are for bi-directionally communicating with another I/O device, via a short range radio link 101, real-time audio signals over a synchronous circuit-switched transport. ACL communication modules 124 and 125 are for bi-directionally communicating with another I/O device, via a short range radio link 101, real-time audio signals over an asynchronous packet-switched transport. Selecting modules 126 and 127 are for selecting one of the transports for real-time audio signal communication based upon operating conditions.

Queue controller modules 140 and 141 are for managing packets in an encoder or decoder queue. The processes of the queue controller are discussed in more detail below. While shown with respect to queue controller module 140, both queue controller modules 140 and 141 can include modules. Input stream receiving module 128 can be for receiving at least one input stream that is an audio packet stream. A change stream module 129 can be for receiving control signals to transform the single input queue by processing at least one of a first control signal and a second control signal. The first control signal can be to switch between a first input stream having a first encoder parameter and a second input stream having a second encoder parameter. The second control signal can be to switch between a first encoder parameter and a second encoder parameter within the input stream. The queue controller can further include a determining module 130 for determining, based on the first encoder parameter and the second encoder parameter, whether the single input queue anticipates to contain heterogeneous audio packet types. The queue controller can also include a transforming module 131 for transforming the single input queue from having heterogeneous packet types to a queue having homogeneous packet types in a case where heterogeneous audio packet types are anticipated. The queue controller module can further include a transmitting module 132 for transmitting an output audio packet stream having homogeneous packet types. Moreover, the queue controller module 140 and/or 141 can include an inserting module 133 for inserting at least one empty packet in the queue and/or a packet concealment module 134 for concealing at least one packet in the queue. While the above detailed modules with reference to queue controller module 140 are shown, as mentioned they may also be considered with reference to queue controller module 141 though not shown.

Referring to device 102, FIG. 1 further illustrates that the transceiver 110 is coupled to the controller 106 and that the transceiver 110 can be configured to establish a short range radio link and bi-directionally communicate real-time audio signals 101 over a synchronous circuit-switched (SCO) transport 136 and an asynchronous packet-switched transport (ACL) 138 over the short range radio link in accordance with establishing module 120 for transceiving real-time audio signals from a single source. For example, in bi-directional communication between the headset 102 having a single source voice codec 111 and the handset 104 having a single source voice codec 113, the transmission of the SCO transport 136 and the ACL transport 138 that is a short range radio link 101 can be both processed from a single source, codec 111 and codec 113 of each device 102 and 104, respectively. That is, either or both devices 102 and/or 104 may include a bi-directional single source codec 111 and/or 113, respectively. The system 100 of two devices 102 and 104 can communicate bi-directionally over the short range radio link 101 over a synchronous circuit-switched transport 136 and an asynchronous packet-switched transport 138 either sequentially or simultaneously.

Figure 2:
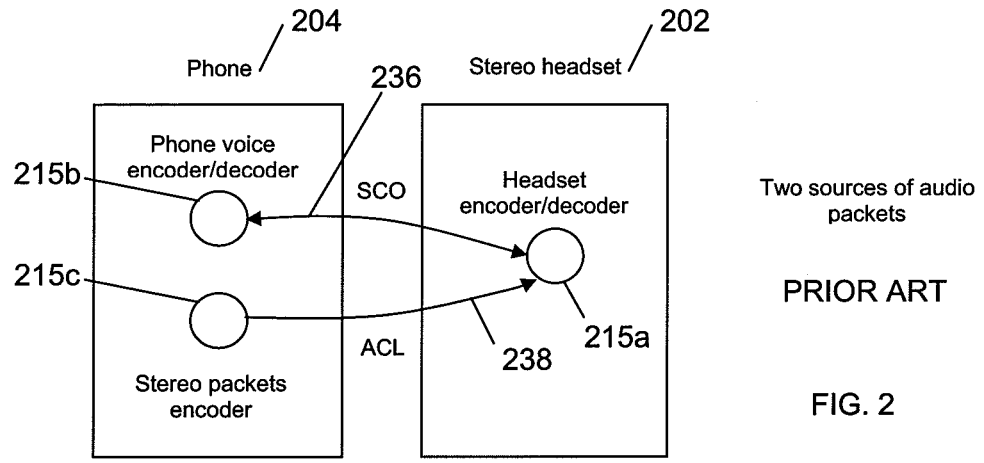
FIG. 2 is a diagram to illustrate prior art uni-directional ACL transport and to illustrate the difference between a uni-directional ACL transport and the detailed bi-directional transport.

FIG. 2 is a diagram to illustrate prior art uni-directional ACL transport and to illustrate the difference in switching between a SCO transport and a uni-directional ACL transport verses a SCO transport and the detailed bi-directional transport. In FIG. 2, an audio terminal such as stereo headset 202 is shown having a codec 215*a*. The headset 202 has one codec 215*a* that acts as a voice encoder/decoder and a stereo decoder while the phone 204 has two devices, a voice encoder/decoder 215*b* and a stereo encoder 215*c*, as two separate sources of encoded audio packets. The two codecs 215*b* and 215*c* can be separate components. The phone voice codec 215*b* encodes and decodes bi-directional audio packets over SCO transports while the stereo packets source 215*c* only encodes uni-directional audio packets over ACL transports. Therefore, the headset 202 communicates via audio signals over one transport, that is, only the SCO transport. In the instant disclosure, the ACL transport can be bi-directional for audio communication as discussed below. Therefore, the below described headset 302 (see FIG. 3) communicates via audio signals over two transports, that is, both the SCO transport and the ACL transport. As described below, the disclosed queue controller 340 (see FIG. 3) may process both uni-directional and bi-directional audio packets over ACL transports.

Figure 3:
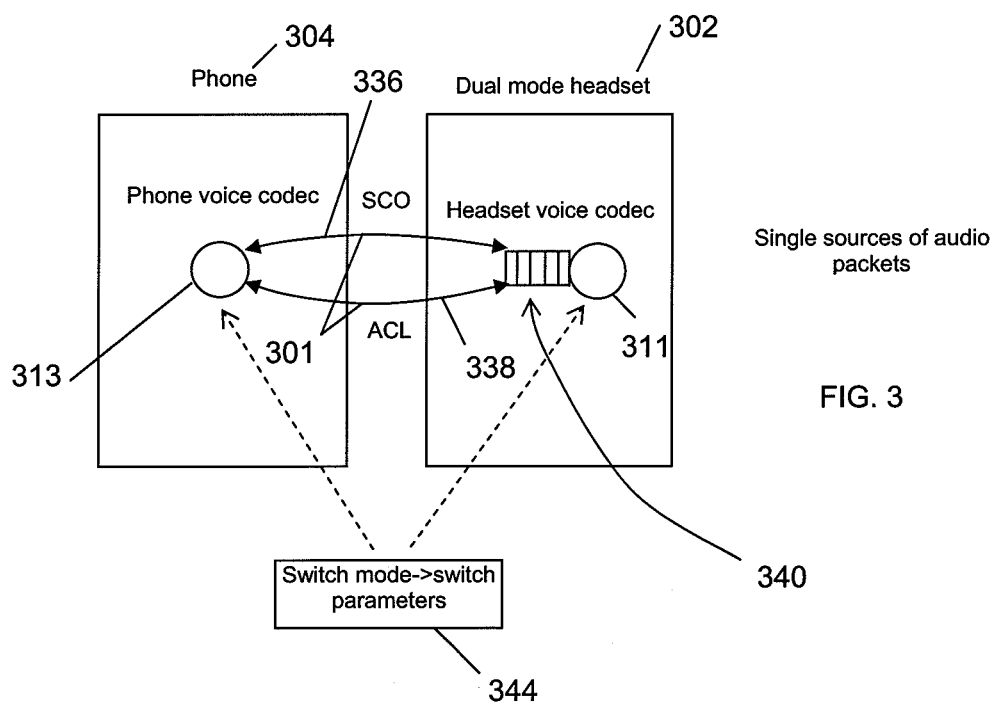
FIG. 3 shows two devices each equipped with single source audio codecs so that both devices may carry out the process described herein.

FIG. 3 shows two devices 302 and 304 each equipped with single source audio codecs 311 and 313 respectively so that both devices may carry out the described process. A queue controller 340 is illustrated on the headset 302 but may also be included on the phone 304. The ACL transport 338 can carry either packet types encoded for audio transmission that are bi-directional and/or packet types that are encoded for stereo that is uni-directional. The SCO transport 336 can carry packet types encoded for bi-directional communication. Together the bi-directional ACL transport and the SCO transport form a short range radio link 301. A handset 304 with a single source voice codec 313 as described may operate better with a headset 302 with a single source voice codec 311 according to this disclosure than the handset 204 (see FIG. 2) that is only capable of communicating bi-directional audio over the SCO transport.

Figure 4:
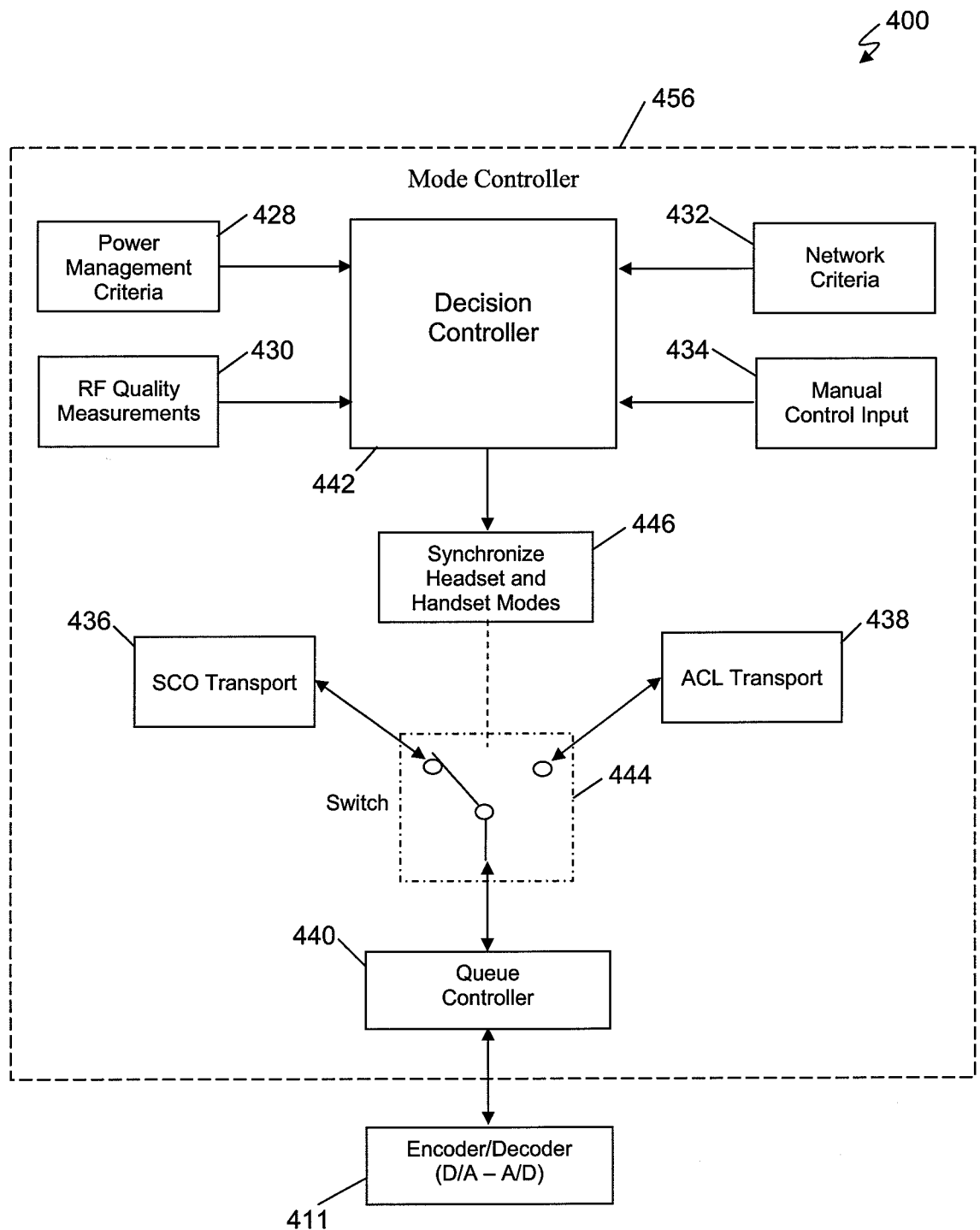
FIG. 4 is an architecture diagram including a mode controller.

FIG. 4 is an architecture diagram 400 including a mode controller 456. Mode controller 456 may include a decision making level indicated by the decision controller 442, a preparation level indicated by the synchronization controller 446 and an executing level indicated by the switch 444 in combination with the queue controller 440. The decision controller 442 may receive signals relating to operating conditions in accordance with selecting modules 126 and 127 (see FIG. 1). The decision controller 442 may receive signals from one or more of the power management criteria input 428, the RF quality measurements input 430, the network criteria input 432, and the manual control input 434. The decision controller 442 can accordingly decide when to switch from SCO to ACL or vice-versa.

The preparation level can contain a synchronization controller 446. The executing level can provide the switch 444 between the SCO and ACL after the time/signaling messages are exchanged between the headset 102 (see FIG. 1) and the handset 104 to synchronize the switching. The hardware and/or software switch 444 for transport selection of one of the transports for real-time audio signal communication may be manually activated and/or automatically activated and based upon operating conditions to choose between the SCO transport 436 which may be the default transport, and the ACL transport 438. While the decision to switch is made by the decision controller 442, the operation to switch may be performed by a software and/or hardware switch 444 and a queue controller 440 at the executing level. The queue controller 440 operation may be performed between the switch 444 and the encoder/decoder 411 such as a codec (D/A-A/D).

The output of the switch 444 is processed by a queue controller 440 that can be configured to deliver at least one packet between transmission of the synchronous transport 436 and the asynchronous transport 438. That is, upon transport selection according to the selection module 126 (see FIG. 1), the switch between the synchronous circuit-switched transport and an asynchronous packet-switched transport can be processed by the queue controller 440 that can be configured to deliver at least one packet to the encoder/decoder when at least one of a wireless audio terminal and an audio gateway is in audio communication.

Figure 5:
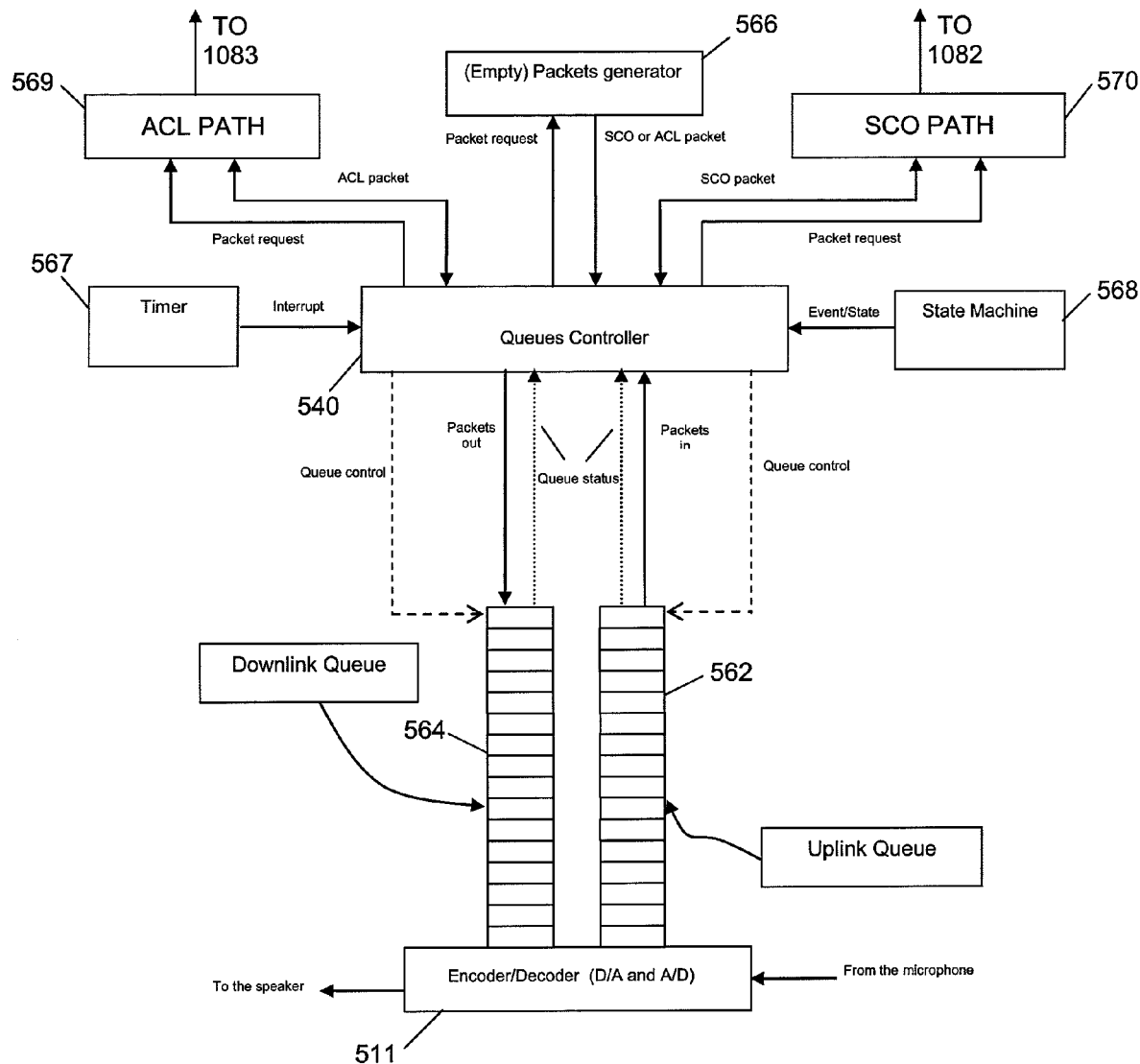
FIG. 5 illustrates input and output of the queue controller.

FIG. 5 illustrates input and output of the queue controller 540. As discussed above, the described dual mode headset 102 (see FIG. 1), for example, can have a single D/A and A/D encoder/decoder 511 that can support multiple types of encoded audio packets, over a SCO or ACL transport carrying both audio, and in particular voice payload. The encoder/decoder can have two single input queues for the respective uplink and downlink audio paths including a first queue 562 (see FIG. 5) for uplink audio packets, for example from a microphone of the I/O device, and including a second queue 564 for downlink audio packets, for example to a speaker of the I/O device. The packets from SCO and ACL links can have different encoder parameters such as different packet sizes, packet types, or sampling rates. Accordingly, the mode controller 456 (see FIG. 4) can monitor the buffers when switching between the SCO and the ACL modes.

FIG. 5 illustrates some processes of the above-mentioned queue controller. To prevent the encoder 511 that is processing the downlink queue 564 from not receiving required data and thus being rendered inoperable, the queue contents can be flushed and/or cleared when switching between modes and the packet generator 566 can pad the queue during the mode switch. That is, heterogeneity of the queue can render the decoder of downlink audio or receiver of uplink audio inoperable. For example, measures can be taken to determine, based on a first encoder parameter and a second encoder parameter, whether the queue 564 anticipates to contain heterogeneous audio packet types. Heterogeneous packet types can arise from different encodings for the SCO and ACL modes such as different sampling rates and quantization. If the queue contains packets with different encoding, then the queue 564 can be changed from having heterogeneous packet types to a queue having homogeneous packet types. In one embodiment, the packets generator 566 can supply empty packets in case of stream interruption. In another embodiment the packets generator 566 may use a packet concealment or interpolation method to enhance the user's perceivable quality of experience. Empty packets from the empty packet generator 566 can be processed in queue 562 or queue 564. It is understood that the process works similarly for the uplink audio path utilizing queue 562 and that both can occur simultaneously for proper operation.

As mentioned above, the SCO transport and the ACL transport may be processed sequentially or simultaneously. Different conditions are considered for a soft handoff or a hard handoff as is described below. Since a payload of a single input stream may be processed by the encoder/decoder 511, there may be processing overhead in terms of time taken to establish a new link when there is a change in transport. In a soft handoff, there can be a period of time where two transports are processed simultaneously. As the first transport continues through the queue controller input queue, a second transport can be buffered. Once packets of the second transport are buffered, the first transport can be flushed and the second transport can populate the queue. In this way, there may be simultaneous processing of two transports. As discussed in more detail below, a "make before break" soft handoff process may involve packet concealment. In soft handoff, transition between transports may not be discernible to a user. A soft handoff may consume more power than a hard handoff.

In a hard handoff packets from the first transport can be flushed and packets from the second transport can be populated sequentially, but at the cost of the time taken to establish a new link when there is a change in transport. In a sequential processing the switch may be characterized as a hard handoff and may be discernible to a user due to a time delay between sequential transports. As will be discussed in more detail below, a "break before make" hard handoff process may involve empty packets and/or packet concealment.

It is understood that the queue controller 540 and handoff process are slightly different but may be considered inter-related. The queue controller 540 can prevent buffer under or over-runs for the pulse code modulated (PCM) data to and from the D/A and A/D in the cases when the encoder parameters are changed. For example, encoder parameters can be changed when going from a case where the sampling rate is 8 KHz to one where the sampling rate is 16 KHz or even 44.1 KHz, thus changing from SCO audio to wideband ACL packetized audio or even stereo audio. The queue controller 540 may be needed in any instance where the encoder parameters changed because in that instance the 8 KHz audio packets in the buffer could not be consumed by the codec when it was operating at another sampling rate, 16 KHz, and would cause the encoder to become inoperable.

In the above-discussed case, the 8 KHz samples may be flushed and filled with packets to prevent the D/A from starving. Empty packets or some form of packet concealment may fill the packets when the encoder parameters change, for example sampling rate and packet size.

A hard handoff, or a "Break before Make" connection, can be utilized where the device 102 (see FIG. 1) terminates a SCO connection for audio and then brings up an ACL connection for audio, or vice-versa. Similarly a soft handoff or "Make before Break" connection can be utilized where the device 102 brings up an ACL channel for audio before terminating the SCO channel for audio so for a brief period of time both connections may be broadcasted simultaneously.

A soft handoff may take place without loss of information and therefore the switch can appear seamless to the user. However, a soft handoff may require more processing power and memory to maintain. Therefore the limitations on handoffs may be implementation and hardware specific, though power/battery life can be a control, specifically utilizing hard handoffs when battery power is low. Soft handoffs may not require empty packet transmissions and the hard handoff may be discernable to the user since the connection may be broken and enough information may be lost.

As mentioned, the handoffs may be related to the queue controller. Described are four example scenarios in particular since the operation of the queue controller 540 and handover mechanisms may not be necessarily dependent. The queue controller 540 may be utilized when either the soft or hard handoffs change the encoder parameters. For instance when going from SCO to ACL the sampling rate could change from 8 to 16 KHz to improve speech quality or when switching from ACL to SCO the sampling rate may change from 16 KHz to 8 KHz since SCO may only support the lower audio quality.

As mentioned there are four scenarios discussed below. Hard handovers may include two scenarios, specifically, the same encoder parameters, and a change in encoder parameters. The hard handover case may require the queue controller 540 to send empty packets or conceal packet losses since the connection may be broken, information will be lost, and then a new connection will be re-established. The steps for each may be:

1. Receive signal to change transports;
2. Cease sending packets over SCO or ACL link;
3. Begin sending packets over ACL or SCO link; and
4. Flush packets from downlink and uplink queue sent over previous SCO or ACL link, generate packets to replace lost packets, and populate packets from new ACL or SCO link to the respective downlink and uplink queues.

In the case of a soft handoff with the same codec parameters, the transmission of empty packets or concealment of packet losses may not be required since no data should be lost in such a scenario. The steps may be:

1. Receive signal to change transports;
2. Begin sending packets over additional ACL or SCO link;
3. Cease sending packets over current SCO or ACL link; and
4. Flush packets from downlink and uplink queue sent over previous SCO or ACL link and populate packets from new ACL or SCO link to the respective downlink and uplink queues.

The case of a soft handover where the encoder parameters are changed may require the use of the Queue Controller 540 to insert new packets, not because data is lost but because of the change in sampling rates as illustrated in the previously mentioned figure. In this scenario the steps may be:

1. Receive signal to change transports;
2. Begin sending packets over ACL or SCO link;
3. Cease sending packets over SCO or ACL link; and
4. Flush packets from downlink and uplink queue sent over previous SCO or ACL link and populate packets from new ACL or SCO link to the respective downlink and uplink queues.

Still referring to FIG. 5, the timer 567 can implement synchronization between two devices sending audio information over the short range radio link and between the downlink and uplink queues 564 and 562 monitored by the queue controller 540. The state machine 568 can be an event driver to control signals corresponding to a change in state or conditions and can deliver a change stream signal 757 (see FIG. 7) to the switch 444 (see FIG. 4) and a homogeneous queue converter/encoder 755 (see FIG. 7). The ACL path 569 can be the same respective paths of FIG. 10 to blocks 1083, 1085, and 1086 to then be processed over the air link. The SCO path 570 can be the same respective paths of FIG. 10 to block 1082 to then be processed over the air link.

Figure 6:
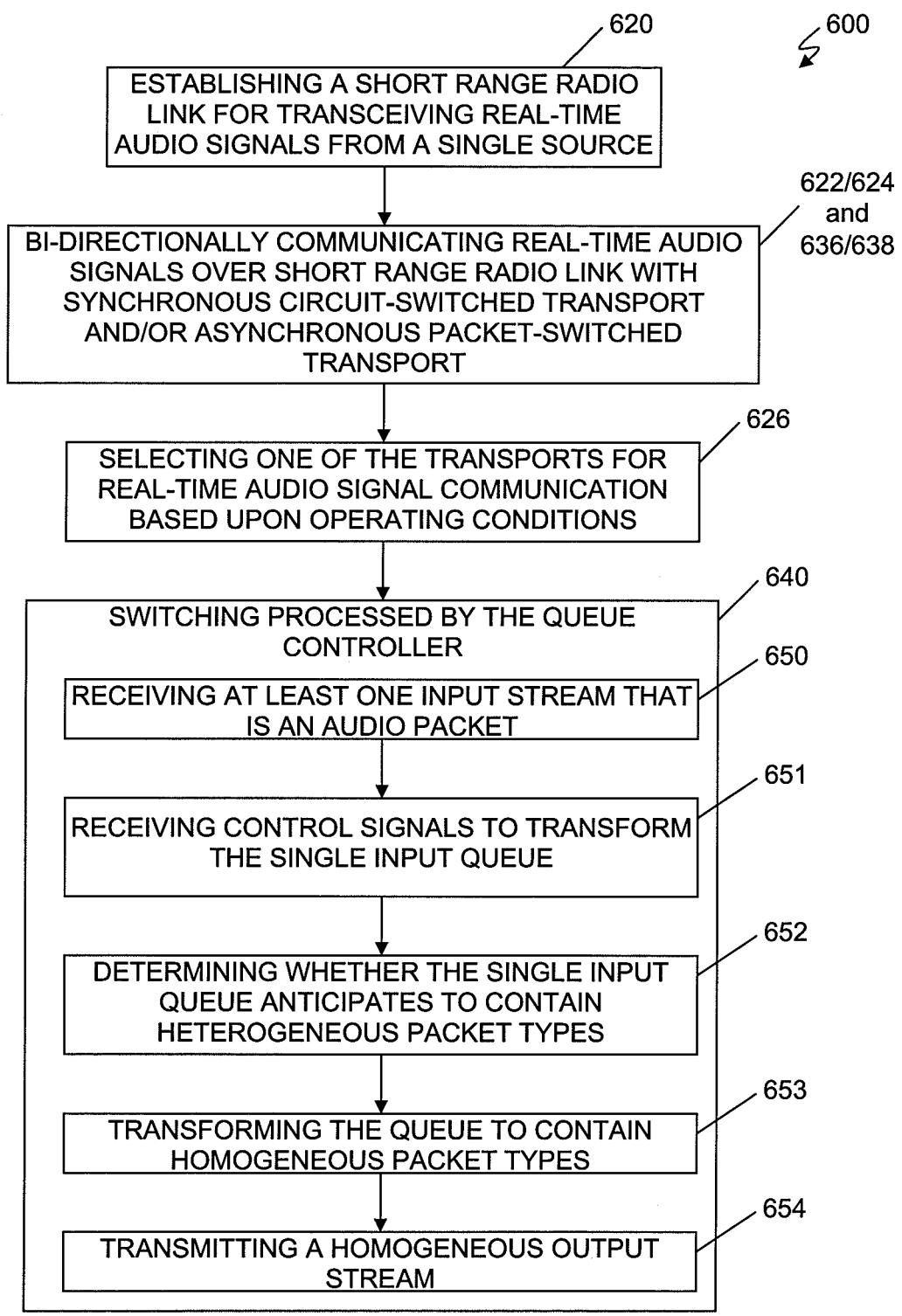
FIG. 6 is a flowchart of a method of a dual mode wireless device including a queue controller and/or a plurality of devices of a system according to an embodiment.

FIG. 6 is a flowchart of a method 600 of a dual mode wireless device and/or a plurality of devices of a system according to an embodiment. As shown in FIG. 1, a short range radio link can be established for real-time audio signals received from a single source 620 according to establishing module 120 and/or 121 (see FIG. 1). As also shown in FIG. 1, real-time audio signals can be communicated bi-directionally 622 and/or 624 over a radio link using a synchronous circuit-switched transport mode (e.g., SCO) 636 and/or using an asynchronous packet-switched transport mode (e.g., ACL) 638 in accordance with synchronous connection oriented communication module 122 and/or 123 and asynchronous connectionless communication module 124 and/or 125. FIG. 4 illustrates one of the transports is selected for real-time audio signal communication based upon operating conditions 428, 430, 432 and 434, as described above and according to selecting module 126 and/or 127 (see FIG. 1) for selecting 626 one of the transports 636/638. FIG. 4 shows a switch 444 for switching between one transport and the other is processed by the queue controller 640 according to queue controller module 140 and/or 141.

The method of switching processed by queue controller 640 for encoding and decoding of audio data for communication of a single input queue can include receiving at least one input stream that is an audio packet stream 650 and receiving control signals to transform the single input queue 651 by processing at least one of a first control signal 757 (see FIG. 7) to switch between a first input stream having a first encoder parameter and a second input stream having a second encoder parameter and/or a second control signal 758 (see FIG. 7) to switch between a first encoder parameter and a second encoder parameter within the input stream. The method of the queue controller further includes determining 652, based on the first encoder parameter and the second encoder parameter, whether the single input queue anticipates to contain heterogeneous audio packet types, transforming 653 the single input queue from having heterogeneous packet types to a queue having homogeneous packet types in a case where heterogeneous audio packet types are anticipated, and then transmitting 654 an output audio packet stream having homogeneous packet types. The method of the queue controller is applicable to both downlink and uplink queues 564/562 (see FIG. 5). Modules 118 and/or 119 (see FIG. 1) including queue controller modules 140 and/or 141 including instructions for these processes may be stored in the memory 114 and/115 of a device 102 and/or 104. It is understood that fewer or more steps may be included in the above-described method.

Figure 7:
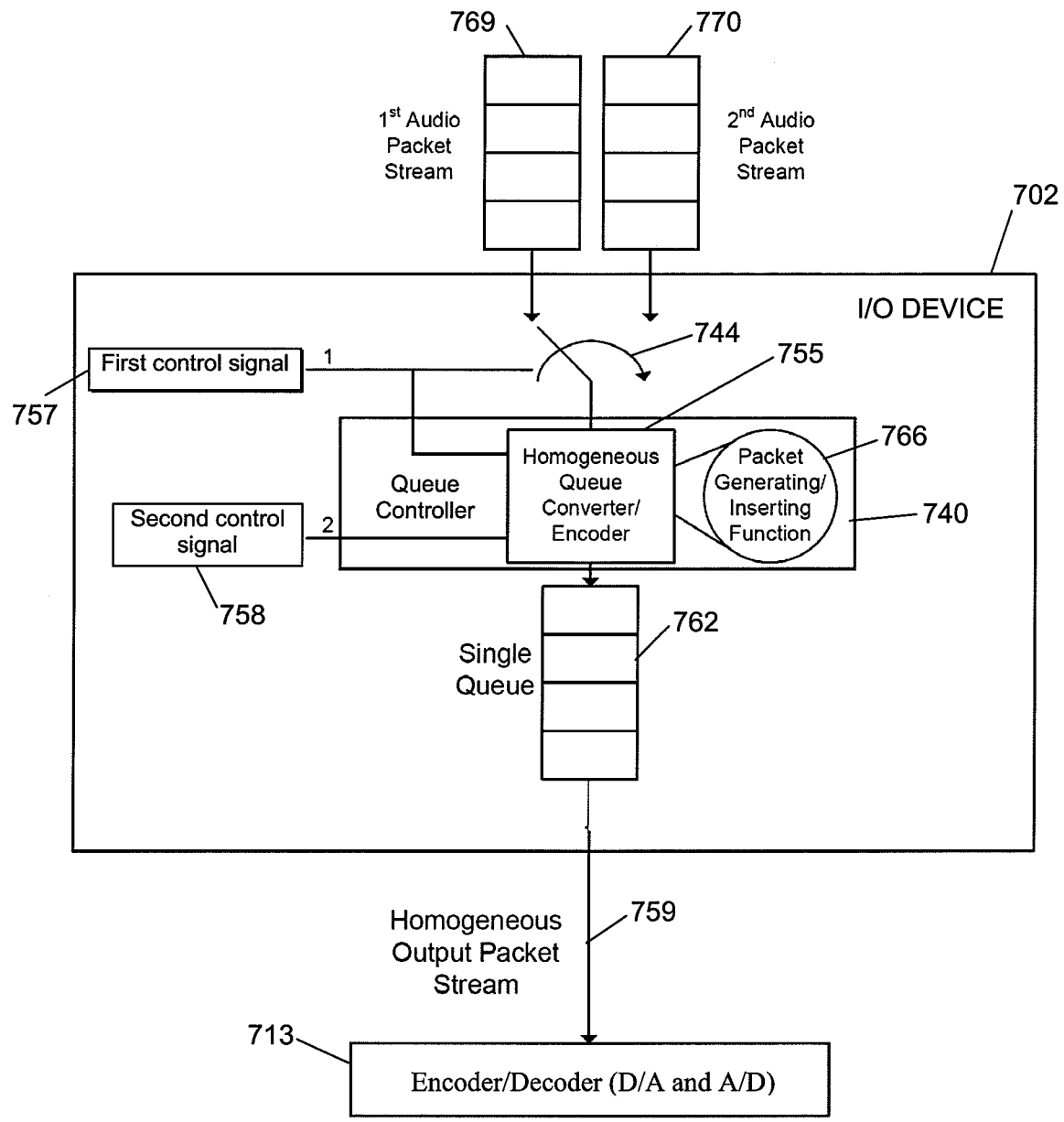
FIG. 7 illustrates process components that can be part of a queue controller of, for example, an I/O device of FIG. 1.

FIG. 7 illustrates process components that can be part of a queue controller 740 of, for example, an I/O device 702 and shows the process for the downlink queue 564 (see FIG. 5) and the downlink audio path but the method is similar for the uplink queue 562 and uplink audio path. As discussed above, there can be a choice of two transports, for example an ACL and a SCO that may have packets with different encoder parameters. There can also be a choice of communication over an ACL transport that is uni-directional or that is bi-directional and therefore a change in encoder parameters may be required for processing even though the transport is the same. FIG. 7 illustrates a first audio packet stream 769 that may be from an ACL transport and a second audio packet stream 770 that may be from a SCO transport in this example. As discussed, the first packet stream 769 and second packet stream 770 may both be over an ACL transport but have different encoder parameters. An encoder parameter may be at least one of packet size, packet type, sampling rate and number of channels. It is understood that other encoder parameters may be considered.

The queue controller 740 can be transport agnostic but concerned with the type of encoded audio packets. The protocol overhead is removed leaving the audio payload by the time the packets reach the queue controller 740. How the audio is encoded for the codec may be the concern of the queue controller. In general a VoIP and cellular network of different types can use different audio encoding hence the queue controller may be required to prepare the single input queue 762 for the codec 713. Accordingly, encoding and/or decoding for audio and/or voice for any transports used for any protocols are within the scope of this discussion.

A method of an I/O device for encoding of audio data for communication, the device including a queue controller of a single input queue can include receiving at least one input stream that is an audio packet stream, being the first audio packet stream 769 and/or second audio packet stream 770. The homogeneous queue converter/encoder 755 can transform the single input queue by processing a first control signal 757 to switch between a first input stream having a first encoder parameter and a second input stream having a second encoder parameter. The homogeneous queue converter/encoder 755 can also transform the single input queue by processing a control signal to change encoder parameters according to a second control signal 758 to switch between a first encoder parameter and a second encoder parameter within one input stream. The input streams and the encoder parameters are discussed in more detail with respect to FIGS. 8 and 9. The state machine 568 (see FIG. 5) can be an event driver to control signals corresponding to a change in state or conditions and can deliver a change stream signal to the switch 444 (see FIG. 4) and a homogeneous queue converter/encoder 755.

The method of the queue controller 740 includes determining based on the first encoder parameter and the second encoder parameter, whether the single input queue anticipates to contain heterogeneous audio packet types and then transforming by a packets generating and/or inserting function 766 the single input queue 762 from having heterogeneous packet types to a queue having homogeneous packet types in a case where heterogeneous audio packet types are anticipated. The queue controller 740 can then transmit an output audio packet stream 759 having homogeneous packet types to, for example, an encoder/decoder 713.

Figure 8:
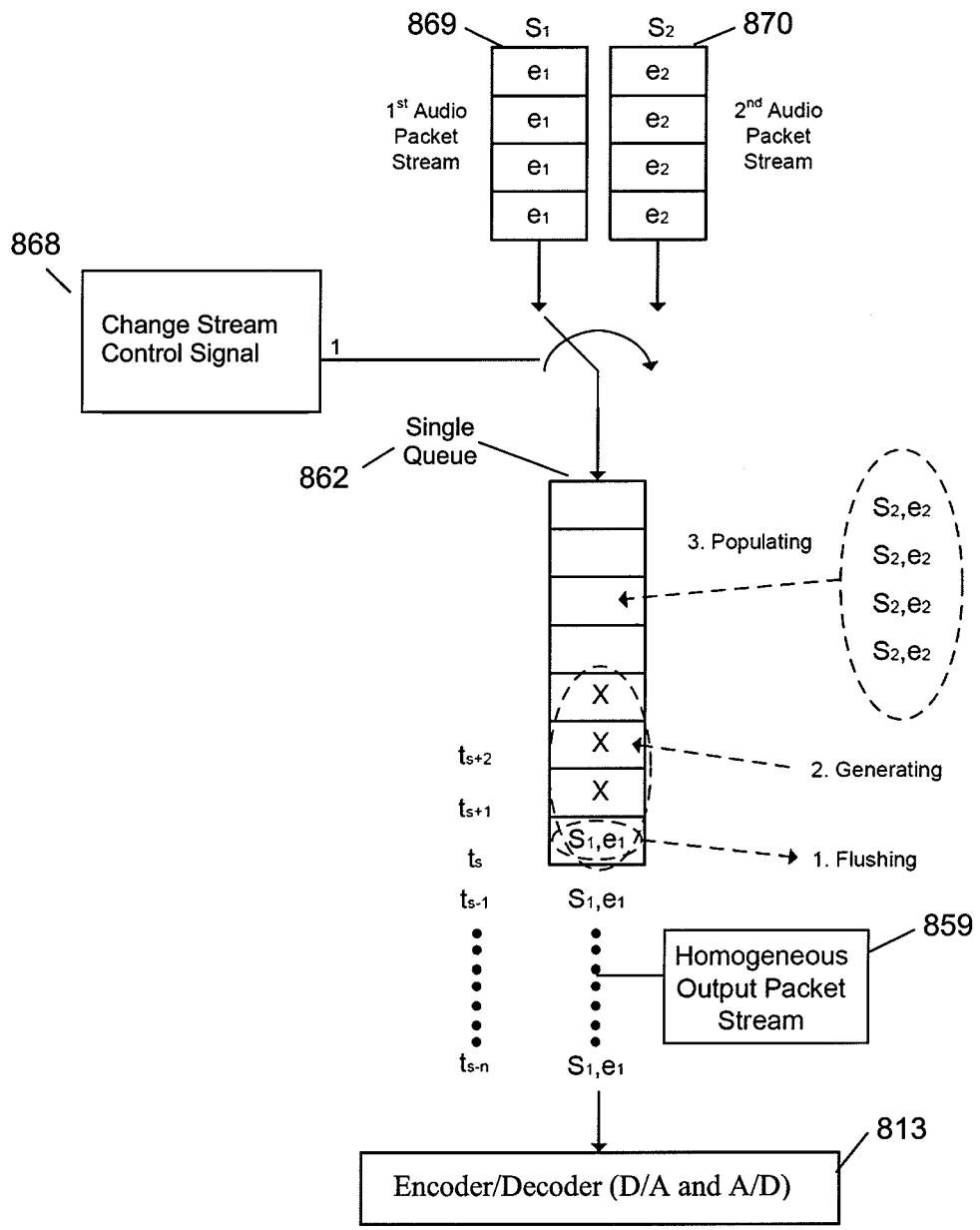
FIG. 8 illustrates a hard handoff scenario in accordance with a first control signal.
Figure 9:
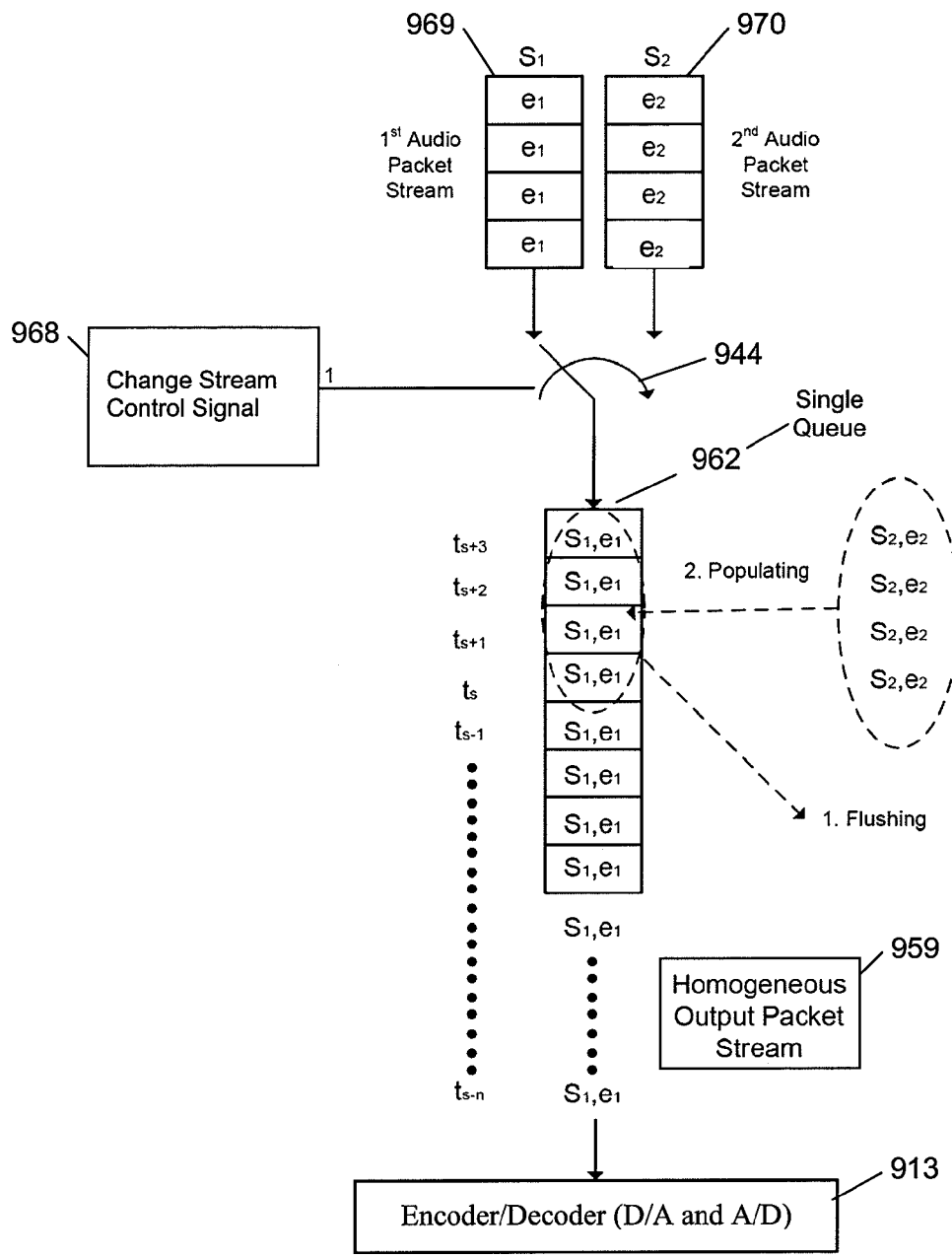
FIG. 9 illustrates processing a soft handoff, as indicated by the first control signal.

FIG. 8 illustrates a hard handoff scenario while FIG. 9 illustrates a soft handoff scenario in accordance with the first control signal 757 (see FIG. 7) for the downlink audio path. The process for the uplink audio path would be symmetric. Methods of the queue controller can include processing a hard handoff when the first encoder parameter and the second encoder parameter are the same or are different, according to a change stream control signal 868 which is the same as the first control signal 757 (see FIG. 7). The processing can include flushing the single input queue having packets from the first input stream 869, generating packets to replace lost packets by packet generating/inserting function 766 (see FIG. 7) and populating the single input queue 862 with packets from the second input stream 870 for a homogeneous output packet stream 859 to the encoder/decoder 813.

FIG. 9 illustrates processing a soft handoff, as indicated by the first control signal 757 (see FIG. 7), for the downlink audio path, when the first encoder parameter and the second encoder parameter are the same or are different, according to a change stream control signal 968 which is the same as the first control signal 757 (see FIG. 7). The process for the uplink audio path would be symmetric. The processing can include flushing the single input queue 962 having packets from the first input stream 969 and populating the single input queue 962 with packets from the second input stream 970 for a homogeneous output packet stream 959 to the encoder/decoder 913. In the soft handover, appropriate timing and synchronization 446 (see FIG. 4) may be required. With synchronization of soft handoffs with or without codec parameter changes may not require the generation of packets since none may be lost. When encoder parameters are changed without switching transports, it is possible that packet generation may be needed.

When the first encoder parameter and the second encoder parameter are different as indicated by the second control signal 758 (see FIG. 7) the processing can include flushing the single input queue having packets of the first encoder parameter and populating the single input queue 862 and/or 962 with packets of the second encoder parameter. The packet generating/inserting function 766 (see FIG. 7) is for inserting at least one empty packet in the queue and/or concealing at least one packet in the queue.

Figure 10:
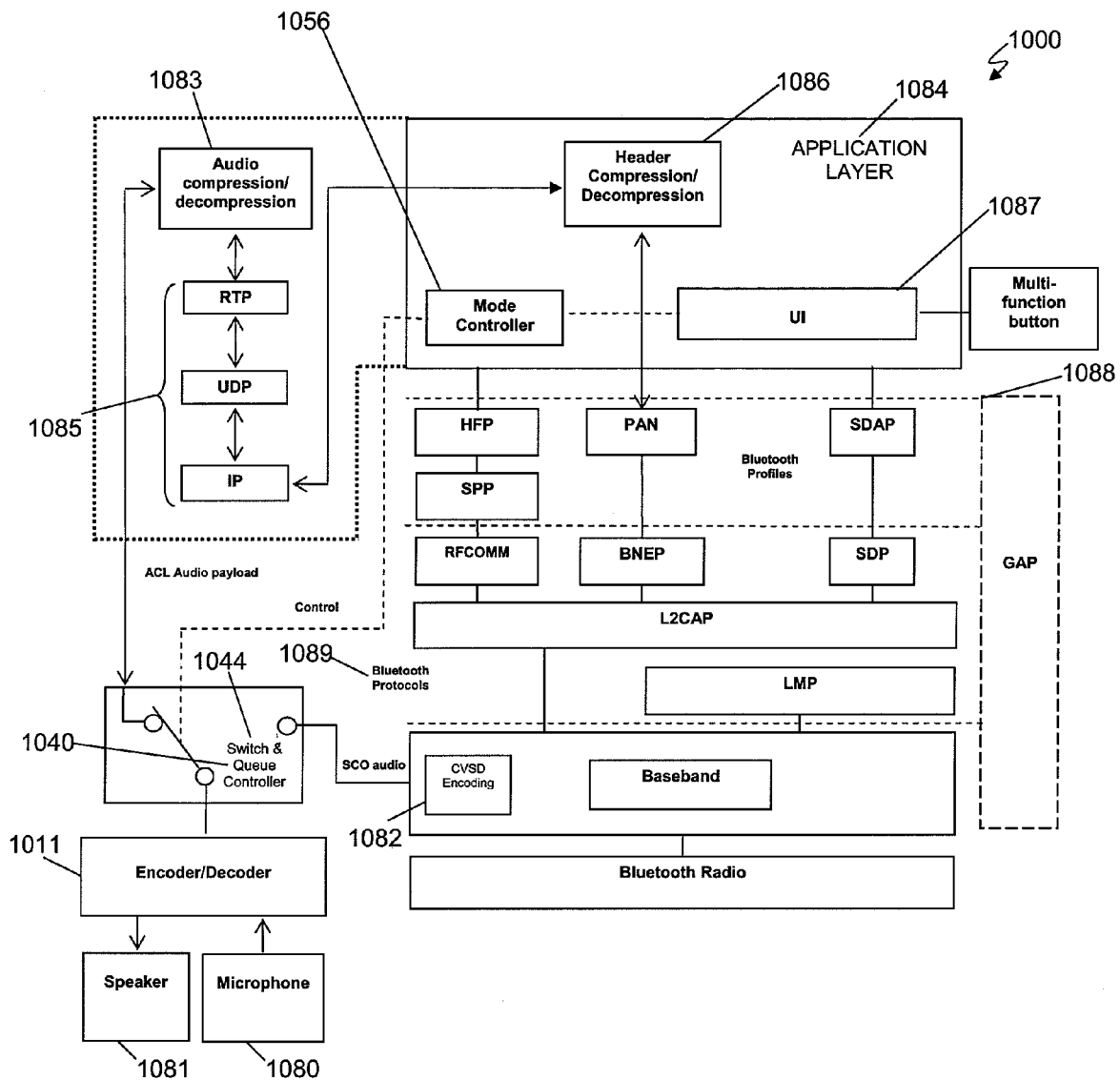
FIG. 10 depicts some architecture components of a Bluetooth enabled I/O device such as the headset of FIG. 1.

FIG. 10 depicts some architecture components 1000 of a Bluetooth enabled I/O device such as a headset 102 (see FIG. 1). The mode controller 1056, the switch 1044, queue controller 1040 and encoder 1011 were discussed above. A microphone 1080 may provide input to the encoder 1011, and a speaker 1081 may receive output from the decoder 1011. When SCO audio transport is used, continuously variable slope delta (CVSD) encoding takes place within the hardware of the baseband processor 1082.

When ACL audio transport is used, audio compression and decompression 1083 takes place within an application layer 1084. The ACL audio packets conform to data protocols such as a real-time transport protocol (RTP), a user datagram protocol (UDP), and an Internet Protocol (IP) 1085. Packets may undergo header compression/decompression 1086. A user interface 1087 may be accessed using for example, a multi-function button, for manual control of switching between one transport and another.

Bluetooth profiles 1088 may use the ACL transport. Such profiles can include signaling for a handsfree profile (HFP) and data for a serial port profile (SPP), a personal area networking profile (PAN), a service discovery application profile (SDAP), and a generic access profile (GAP). Moreover, the ACL packets may further conform to protocols such as a logical link control and adaptation protocol (L2CAP), a link manager protocol (LMP), a service discovery protocol (SDP), and a Bluetooth network encapsulation protocol (BNEP) 1089. Radio frequency communication protocol (RFCOMM) provides emulation of serial ports within L2CAP.

As described in detail above, during transmission and receipt of audio signals, and in particular voice signals, a Bluetooth device can switch between a synchronous circuit-switched transport and an asynchronous packet-switched transport, each having particular characteristics and benefits and mutually exclusive for voice, except, for example during the switching process where they may be simultaneously transmitted. The ability to use two transports for bi-directional audio signals with the ability to seamlessly handoff between the two can significantly improve the voice quality over Bluetooth and the user's handsfree experience. In a system such as a Bluetooth headset and a Bluetooth enabled handset, one or the other device can make a transport selection of one of the transports for real-time audio signal communication based upon operating conditions and/or manual activation. Bluetooth devices and particularly, headsets enjoy popularity because they provide users the ability to communicate while seamlessly operating in different environments. Accordingly, providing improved voice quality over Bluetooth has become important for mobile device manufacturers. As described above, improvements made to bi-directional audio communication, and in particular voice quality over Bluetooth may be beneficial.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of an I/O device for encoding of audio data for communication, the device including a queue controller of a single input queue, the method comprising:
   receiving at least one input stream that is an audio packet stream; and
   receiving control signals to transform the single input queue by processing at least one of:
   a first control signal to switch between a first input stream having a first encoder parameter and a second input stream having a second encoder parameter; and a second control signal to switch between a first encoder parameter and a second encoder parameter within the input stream;
   determining, based on the first encoder parameter and the second encoder parameter, whether the single input queue anticipates heterogeneous audio packet types;
   transforming the single input queue from having heterogeneous packet types to a queue having homogeneous packet types in a case where heterogeneous audio packet types are anticipated; and
   transmitting an output audio packet stream having homogeneous packet types; and
   processing a hard handoff, as indicated by the first control signal, when the first encoder parameter and the second encoder parameter are the same or are different, the processing comprising: flushing the single input queue having packets from the first input stream; generating packets to replace lost packets; and populating the single input queue with packets from the second input stream.

2. The method of claim 1, further comprising: processing a soft handoff, as indicated by the first control signal, when the first encoder parameter and the second encoder parameter are the same or are different, the processing comprising: flushing the single input queue having packets from the first input stream; and populating the single input queue having packets from the second input stream.

3. The method of claim 1, further comprising: when the first encoder parameter and the second encoder parameter are different as indicated by the second control signal, the processing comprising: flushing the single input queue having packets of the first encoder parameter; and populating the single input queue with packets of the second encoder parameter.

4. The method of claim 1 further comprising: inserting at least one empty packet in the queue.

5. The method of claim 1 further comprising: concealing at least one packet in the queue.

6. The method of claim 1 wherein an encoder parameter is at least one of packet size, packet type, sampling rate and number of channels.

7. The method of claim 1 wherein the input stream is a synchronous circuit-switched transport.

8. The method of claim 7 wherein the synchronous circuit-switched transport is a Bluetooth synchronous connection-oriented or extended synchronous connection-oriented transport.

9. The method of claim 1 wherein the input stream is an asynchronous packet-switched transport.

10. The method of claim 9 wherein the asynchronous packet-switched transport is a Bluetooth asynchronous connection-oriented transport.

11. An I/O device for encoding of audio data for communication, comprising:
    a wireless communication device including a queue controller of a single input queue;
    an input stream receiving module for receiving at least one input stream that is an audio packet stream; and
    a change stream receiving module for receiving control signals to transform the single input queue by processing at least one of: a first control signal to switch between a first input stream having a first encoder parameter and a second input stream having a second encoder parameter; and a second control signal to switch between a first encoder parameter and a second encoder parameter within the input stream;
    the change stream receiving module configured to process a hard handoff, as indicated by the first control signal, when the first encoder parameter and the second encoder parameter are the same or are different, the processing configured to: flush the single input queue having packets from the first input stream; generate packets to replace lost packets; and populate the single input queue with packets from the second input stream;
    the queue controller comprises: a determining module for determining, based on the first encoder parameter and the second encoder parameter, whether the single input queue anticipates to contain heterogeneous audio packet types; a transforming module for transforming the single input queue from having heterogeneous packet types to a queue having homogeneous packet types in a case where heterogeneous audio packet types are anticipated; and a transmitting module for transmitting an output audio packet stream having homogeneous packet types.

12. The device of claim 11 wherein the transforming module of the queue controller comprises: an inserting module for inserting at least one empty packet in the queue.

13. The device of claim 11 wherein the transforming module of the queue controller comprises: a packet concealment module for concealing at least one packet in the queue.

14. The device of claim 11 wherein an encoder parameter is at least one of packet size, packet type, sampling rate and number of channels.

15. The device of claim 11 wherein the device is a Bluetooth enabled device.

16. An I/O device for encoding audio data for communication, comprising:
- a queue controller configured to process a hard handoff, the processing comprising: flushing a single input queue having packets from a first input stream; generating packets to replace lost packets; and populating the single input queue with packets from a second input stream;
- a transceiver coupled to the controller, the transceiver configured to establish a short range radio link and bi-directionally communicate real-time audio signals over a synchronous circuit-switched transport and an asynchronous packet-switched transport over the short range radio link from a single source of real-time audio signals; and
- a switch for transport selection of one of the transports for real-time audio signal communication based upon operating conditions, wherein the switch is processed by the queue controller, the switch is configured to deliver at least one packet between transmission of the synchronous transport and the asynchronous transport;
- an input stream receiving module for receiving at least one input stream that is an audio packet stream; and
- a change stream receiving module for receiving control signals to transform the single input queue by processing at least one of: a first control signal to switch between a first input stream having a first encoder parameter and a second input stream having a second encoder parameter; and a second control signal to switch between a first encoder parameter and a second encoder parameter within the input stream;
- wherein the change stream receiving module is configured to process a hard handoff, as indicated by the first control signal, when the first encoder parameter and the second encoder parameter are the same or are different, the processing configured to: flush the single input queue having packets from the first input stream; generate packets to replace lost packets; and populate the single input queue with packets from the second input stream
- wherein the queue controller comprises: a determining module for determining, based on the first encoder parameter and the second encoder parameter, whether the single input queue anticipates to contain heterogeneous audio packet types; a transforming module for transforming the single input queue from having heterogeneous packet types to a queue having homogeneous packet types in a case where heterogeneous audio packet types are anticipated; and a transmitting module for transmitting an output audio packet stream having homogeneous packet types.

17. The device of claim 16 wherein an encoder parameter is at least one of packet size, packet type, sampling rate and number of channels.

18. The device of claim 16 wherein the device is a Bluetooth enabled audio terminal device.

19. The device of claim 16 wherein the device is a Bluetooth enabled audio gateway device.

\* \* \* \* \*